United States Patent
Lapunow et al.

[11] Patent Number: 5,885,442
[45] Date of Patent: Mar. 23, 1999

[54] PROCESS FOR PRODUCING PETROL OF HIGH OCTANE NUMBER BY CATALYTIC REFORMING AND A REACTOR FOR CARRYING OUT THIS PROCESS

[75] Inventors: Michael Grigorjewitsch Lapunow, Pawel- Suchoi-Str. 18, Whg. 168, 246035 Gomel; Walerie Iwanowitsch Abramow, Sowietskaja-str. 97a, Whg. 36, 246028 Gomel, both of Belarus; Volker Sommerfeld, Fr.-y.-Flotow-Ring 01, 18190 Sanitz, Germany; Peter Wasiliewitsch Bolsewitsch, Gomel; Aleksander Petrowitsch Puschkarew, Mosir, both of Belarus

[73] Assignees: Michael Grigorjewitsch Lapunow; Walerie Iwanowitsch Abramow; Volker Sommerfeld, all of Sanitz, Germany

[21] Appl. No.: 637,753
[22] PCT Filed: Sep. 2, 1994
[86] PCT No.: PCT/EP94/02932
   § 371 Date: Jun. 28, 1996
   § 102(e) Date: Jun. 28, 1996
[87] PCT Pub. No.: WO96/07712
   PCT Pub. Date: Mar. 14, 1996
[51] Int. Cl.[6] .................. C10G 35/04; C10G 35/085; B01J 8/02
[52] U.S. Cl. .................. 208/134; 208/138; 208/146; 585/921; 585/922; 585/924; 422/192; 422/218
[58] Field of Search .................. 208/146, 134, 208/138; 585/921, 922, 924; 422/192, 218

[56] References Cited

U.S. PATENT DOCUMENTS

| | | | |
|---|---|---|---|
| 2,315,208 | 3/1943 | Kinnaird | 422/218 |
| 2,614,033 | 10/1952 | Cornell et al. | 422/218 |
| 2,886,517 | 5/1959 | Patton et al. | 208/138 |
| 2,997,374 | 8/1961 | Lavender, Jr. et al. | 208/146 |
| 3,027,244 | 3/1962 | Byrne et al. | 208/146 |
| 3,051,561 | 8/1962 | Grimes | 208/146 |
| 3,067,129 | 12/1962 | Dauber et al. | 208/146 |
| 3,249,405 | 5/1966 | Waddill | 422/192 |
| 3,751,232 | 8/1973 | Borre et al. | 585/924 |
| 3,799,866 | 3/1974 | Lengemann | 208/139 |
| 3,909,208 | 9/1975 | Boret et al. | 208/146 |
| 4,102,776 | 7/1978 | Stone | 208/138 |
| 4,244,922 | 1/1981 | Burke et al. | 208/146 |
| 4,277,444 | 7/1981 | Van Landeghem | 422/218 |
| 4,374,094 | 2/1983 | Farnham | 208/146 |
| 4,374,095 | 2/1983 | Legg et al. | 208/146 |
| 4,421,723 | 12/1983 | Farnham | 208/146 |
| 4,452,761 | 6/1984 | Farnham | 208/146 |
| 4,478,793 | 10/1984 | Vickers | 422/216 |
| 4,869,808 | 9/1989 | Vora et al. | 208/146 |
| 5,013,426 | 5/1991 | Dang Vu et al. | 208/134 |
| 5,202,097 | 4/1993 | Poussin | 422/218 |
| 5,250,270 | 10/1993 | Noe | 422/192 |

FOREIGN PATENT DOCUMENTS

| | | | |
|---|---|---|---|
| 534195 | 3/1993 | European Pat. Off. | 422/218 |
| 1524913 | 11/1989 | U.S.S.R. | 422/218 |
| 1729565 | 4/1992 | U.S.S.R. | 422/218 |

*Primary Examiner*—Walter D. Griffin
*Attorney, Agent, or Firm*—Arnold White & Durkee

[57] ABSTRACT

The invention relates to a process for producing petrol of high octane number by catalytic reforming of hydrocarbons by passing these hydrocarbons through a platinum/rhenium catalyst arranged in the form of a hollow cylinder at 450°–500° C. and a pressure of 1.5–3 MPa in a direction perpendicular to the cylinder axis, in which the feed mixture is passed through in the direction from the cylinder axis to the circumference thereof. The invention further relates to a reactor for carrying out the process mentioned, in particular as shown in FIG. 1.

7 Claims, 5 Drawing Sheets

PROCESS FOR PRODUCING PETROL OF HIGH OCTANE NUMBER BY CATALYTIC REFORMING AND A REACTOR FOR CARRYING OUT THIS PROCESS

This is a nationalization under 35 U.S.C. § 371 of PCT/EP94/02932, filed Sep. 2, 1994.

BACKGROUND OF THE INVENTION

The invention relates to the field of petroleum processing or petrochemistry, concretely processes for processing hydrocarbons and apparatus for carrying them out, in particular to motor fuels as are described in Ullmann's Encyclopedia of Industrial Chemistry, Vol. A 16, Verlag Chemie Weinheim, 1990, pp. 719–753; the entire contents of this publication are hereby incorporated by reference.

Catalytic reforming is generally a refining step in petrochemistry, in particular the thermal and/or catalytic conversion of certain petroleum products, in particular heavy naphthas and so-called straight-run petrols, into aromatics and isoparaffins. The purpose of reforming is to increase the octane number of motor fuels and also to obtain byproducts suitable for the chemical industry, such as the BTX fraction. The details of reforming are well documented; reference is here made only by way of example to Ullmann's Encyclopedia of Industrial Chemistry, Vol. A 18, Verlag Chemie Weinheim, 1991, pp. 51–99, in particular pp. 67–70 (Catalytic Reforming).

E. V. Smidovich, Tekhnologya pererabotky nefty i gaza, "Khimya" publishers, Moscow, 1968, part 2, pp. 243–245 (1) discloses a process for producing petrol of high octane number by catalytic reforming of petrol fractions of low octane number at temperatures of 500°±50° C. and a pressure of up to 3.5 MPa with dilution of the feed mixture by a circulated hydrogen-containing gas in an amount of 1500 standard m$^3$/standard m$^3$ of feed mixture at a molar concentration of hydrogen in the hydrogen-containing circulated gas of at least 75% in the presence of an alumino platinum catalyst having a metallic platinum content of at most 0.63% at a space velocity of the feed mixture of from 1.5 to 1.8 standard m$^3$/standard m$^3$ of catalyst.

The starting mixture and the steam/gas mixture are passed through the catalyst bed parallel to the vertical axis (axially) of the reactor which is a vertical cylindrical vessel having an axial, fully metallic tube for drawing off a gaseous product mixture and a perforated metallic insert arranged therein, with a catalyst bed being located between the walls of the insert and the central tube.

However, this process for producing petrol of high octane number has the following disadvantages:

1. high hydraulic losses when the steam/gas mixture passes through the catalyst bed, owing to a high linear flow velocity because of the limited effective cross-sectional area of the catalyst bed;
2. the presence of catalyst dust which, under the process conditions, collects at the outlet of the gaseous product mixture from the catalyst bed and reduces the effective cross-section;
3. increased pressure in the system which shifts the chemical conversion of the hydrocarbon starting material in the direction of the formation of low-value reforming products (byproducts); the proportion of hydrocracking products increases.

As regards its technology, the process of the invention comes closest to a process disclosed in Khimya i tekhnologya topliv i masel, "Khimya" publishers, Moscow, 1966, No. 3, p. 14 (2) for producing petrol of high octane number by catalytic reforming of a mixture of hydrogen and hydrocarbons by passing this mixture through a platinum/rhenium catalyst arranged in the form of a hollow cylinder at 450°–500° C. and a pressure of 1.5–3 MPa. The feed mixture flows in the direction from the circumference of the reactor to the axis thereof. The platinum/rhenium catalysts used in this process are known and commercially available.

The petrol of high octane number is produced by catalytic reforming of petrol fractions of low octane number at a temperature of 450°–500° C. and a pressure of 2.8 to 5.0 MPa with dilution of the feed mixture by hydrogen-containing circulated gas in an amount of 1500 standard m$^3$/standard m$^3$ of feed at a molar concentration of the hydrogen in the hydrogen-containing circulated gas of 85% (the molar ratio of hydrogen to feed is generally 8:1) in the presence of the platinum/rhenium catalyst having a metallic platinum content of 0.30–0.65% at a space velocity of the feed mixture of 1.5–1.8 m$^3$/h per m$^3$ of catalyst.

The disadvantages of this process are:
1. insufficient yield of product—up to 93.86% (cf. Example 1 which reproduces the prior art);
2. the low octane number of the product—77.2 MON (motor octane number).

SUMMARY OF THE INVENTION

The invention relates to a process for producing high-octane petrol by the catalytic reforming of hydrocarbons by taking said hydrocarbons through a platinum-rhenium catalyst in the shape of a hollow cylinder at 450°–500° C. and a pressure of 1.5–3 MPa in a direction perpendicular to the cylinder axis, in which the inserted mixture passes from the axis to the periphery of the cylinder. The invention also relates to a reactor for implementing said process, especially in accordance with FIG. 1.

DESCRIPTION OF THE PREFERRED EMBODIMENTS

It is an object of the invention to increase the yield of product of high octane number and to improve the quality thereof.

This object is achieved by the present invention.

In a process for producing petrol of high octane number by catalytic reforming of a mixture of hydrogen and hydrocarbons by passing this mixture through a platinum/rhenium catalyst arranged in the form of a hollow cylinder at 450°–500° C. and a pressure of 1.5–3 MPa in a direction perpendicular to the cylinder axis, the feed mixture is, according to the invention, passed through in the direction from the cylinder axis to the circumference thereof.

The feed mixture preferably flows at a space velocity of 1.5–1.8 h$^{-1}$.

The volume ratio of hydrogen-containing gas to the hydrocarbons (hereinafter: "flow factor") is preferably 1200–1800 standard m$^3$/standard m$^3$ of HC (HC= hydrocarbon).

The above-specified features of the invention achieve the following technical effect.

In the reactions possible over the catalyst, the equilibrium is shifted in the direction of an increase in the percentage yield of cyclopentanes and isoparaffins, with at the same time the amount of aromatic hydrocarbons being reduced slightly and the yield of gaseous materials decreasing (which leads to an increase in the stability of the catalyst). This results from the fact that, in contrast to the closest prior art, in the process of the invention the feed mixture first comes into contact with a relatively small amount of catalyst, which amount increases along the further flow path of the feed mixture through the catalyst bed with simultaneous alteration of the composition of the feed mixture.

If the feed mixture is passed through the catalyst bed at a space velocity of less than 1.5 $h^{-1}$, the composition of the catalyst is only slightly different from that in the prior art as described in (2), namely by a maximum of 3–5%.

However, if the feed mixture is passed through the catalyst bed at a space velocity of >1.8 $h^{-1}$, the reactor is not able to completely process the feed mixture.

If the flow factor is less than 1200 standard $m^3$/standard $m^3$ of HC, the coke yield increases.

If the flow factor is more than 1800 standard $m^3$/standard $m^3$ of HC, the amount of iso-hydrocarbons and cyclic hydrocarbons decreases slightly (by 3–5%).

The process of the invention is distinguished from that described in (2) by the feed mixture being passed through the catalyst bed in the direction from the axis of the cylinder to the circumference thereof. The process of the invention thus meets the inventive criterion of "novelty".

The technical scientific literature and the patent literature have hitherto not described any process for catalytic reforming in which the starting mixture flows in the direction from the axis of a cylindrical catalyst to the circumference thereof. The process of the invention thus meets the inventive criterion of "an inventive step".

The process of the invention can be applied in the petrochemical and petroleum processing industry; it allows the yield of petrol of high octane number to be increased and the quality thereof to be improved. The process of the invention thus meets the inventive criterion of "industrial usefulness".

The process of the invention can be carried out with the aid of a further invention, namely a reactor for catalytic reforming.

There is known a reactor for producing petrol of high octane number by catalytic reforming, comprising a housing having ports for the entry of the feed mixture and for the exit of catalyst, a hollow insert arranged in the housing clear of the external wall and of the internal surface of the housing and having an internal and an external wall which are arranged coaxially and provided with openings, with both ends of the insert being fitted with covers, of which one is in the form of an annulus and is arranged between the internal surface of the housing and the internal wall of the insert while the second cover is circular in shape and the end of the insert is able to be completely covered (2).

This reactor is not suitable for carrying out the process of the invention, since in it the gas flows from the circumference of the reactor to the centre.

In a reactor for producing petrol of high octane number by catalytic reforming, comprising a housing having ports for the entry of the feed mixture and for the exit of catalyst, a hollow insert arranged in the housing clear of the external wall thereof and the internal surface of the housing and having an internal and an external wall which are arranged coaxially and provided with openings, with both ends of the insert being fitted with covers, of which one is in the form of an annulus and is arranged between the internal surface of the housing and the internal wall of the insert and the other cover is circular in shape and the end of the insert is able to be completely covered, according to the invention the annular cover is fitted to the end nearest the entry port for the feed mixture while the circular cover is fitted to the end nearest the exit port for the catalyst.

The internal wall of the insert can be cylindrical in shape, with its openings being arranged in such a way that the distance between them decreases in the direction of the axis of the insert from the end nearest the entry port for the feed mixture to the other end. The distance between the openings can decrease by a factor of 1.2–2.5. However, the diameter of the openings remains constant.

The internal wall of the insert can have a diameter which increases in the direction of the axis of the insert from the end thereof nearest the entry port for the feed mixture to the other end.

The internal wall of the insert can, in particular, be conical or, viewed in axial section, in the form of steps.

According to a preferred embodiment of the invention, the internal wall of the insert can, viewed in axial section, be stepped in such a way that the axial cross-sectional area of the steps increases in the direction of the axis of the insert from the end thereof nearest the entry port for the feed mixture to the other end. In particular, the axial cross-sectional area can increase by a factor of 1.2–2.5.

The covers mentioned can consist of two or more parts.

The above mentioned arrangement of the covers allows the gas stream to flow from the center of the reactor towards the circumference. The construction of the internal wall of the insert with a diameter which increases in the direction of the axis of the insert allows constant hydrodynamic conditions for the entry of the gas into the reactor to be maintained along the entire length of the insert.

The two-part construction of the covers makes maintenance of the reactor considerably easier.

The reactor of the invention is distinguished from that described in (1) by the annular cover being arranged at the end nearest the entry port for the feed mixture, while the circular cover is fitted to the end nearest the exit port for the catalyst. The apparatus of the invention thus meets the inventive criterion of "novelty".

In the technical scientific literature and the patent literature, the arrangement of the invention of covers for a reactor for catalytic reforming is not described. Thus the apparatus of the invention meets the inventive criterion of "an inventive step".

The apparatus of the invention can be used in the petrochemical and petroleum processing industry; it allows an increase in the yield of petrol of high octane number and also an improvement in the petrol quality. The apparatus of the invention thus meets the inventive criterion of "industrial usefulness".

An embodiment of the reactor of the invention is shown in FIGS. 1 to 5.

Figure 1:
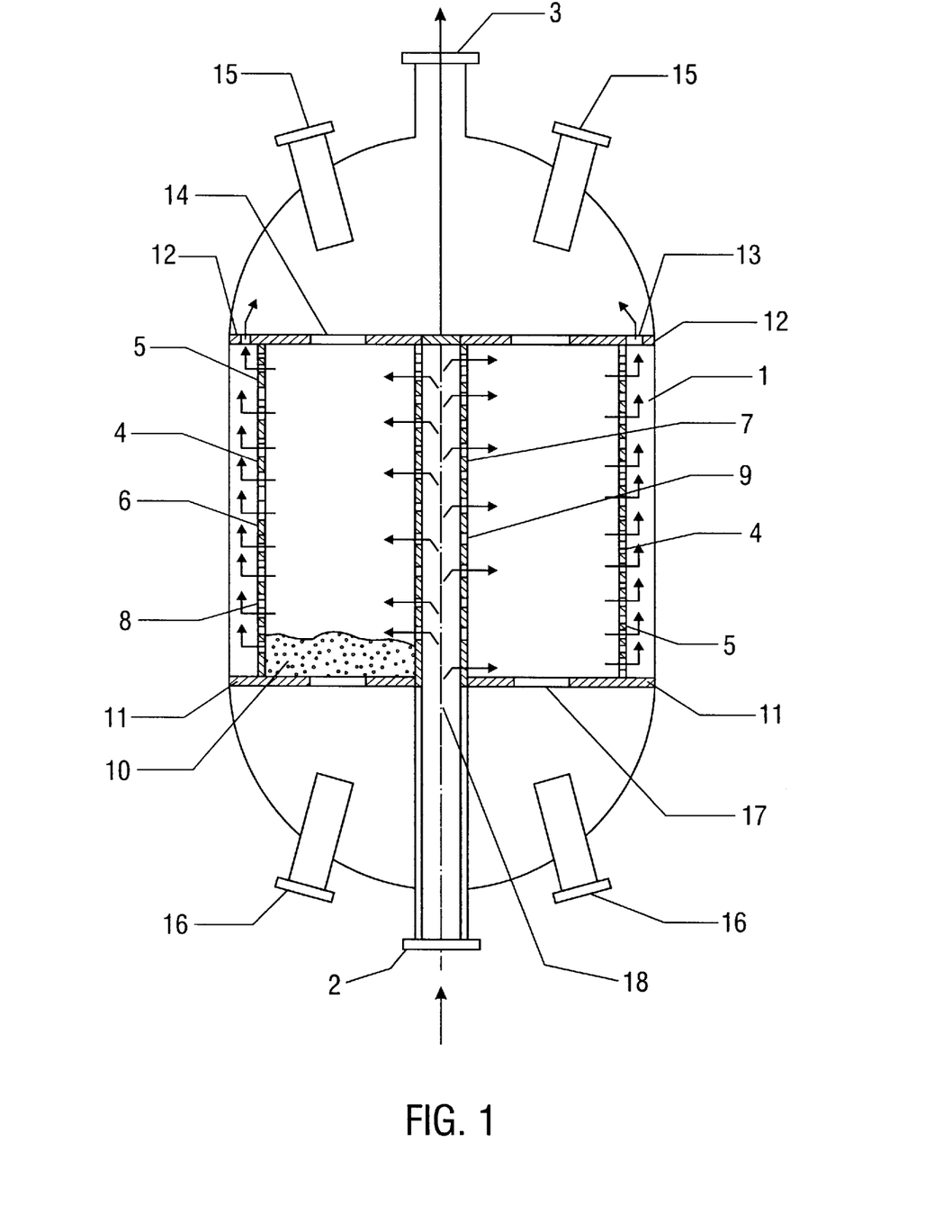
FIG. 1 shows an overall view of the reactor.

FIG. 1 shows an overall view of the reactor. The reactor comprises a housing 1 having flanges 2 and 3 which have openings for the entry of the feed mixture or the exit of the catalyst. In the housing 1 there is arranged at a clearance 4 a hollow insert 5 which has an external wall 6 and an internal wall 7 which are provided with openings 8 and 9 respectively. The external wall 6 has a cylindrical shape. In FIG. 1, the internal wall 7 likewise has a cylindrical shape. Between the walls 6 and 7 there is arranged a platinum/rhenium catalyst 10. Between the internal surface of the housing 1 and the internal wall 7 of the insert 5 there is arranged an annular cover 12 which, for ease of installation, is made up of two parts (it consists of the annular part 12 which covers the intermediate space 4 and the annular part 14 which covers a part of the end of the insert between the walls thereof). The reactor housing has openings 16 for the discharge of catalyst.

The circular cover 11 is fitted to the other end of the insert 5 and covers this end completely. The reactor housing has ports 16 for the discharge of catalyst. The reactor has an annular cover 12 having openings 13 for the exit of the steam/gas mixture. The reactor also has flanges 15 and 16 for input and discharge of catalyst.

Figure 2:
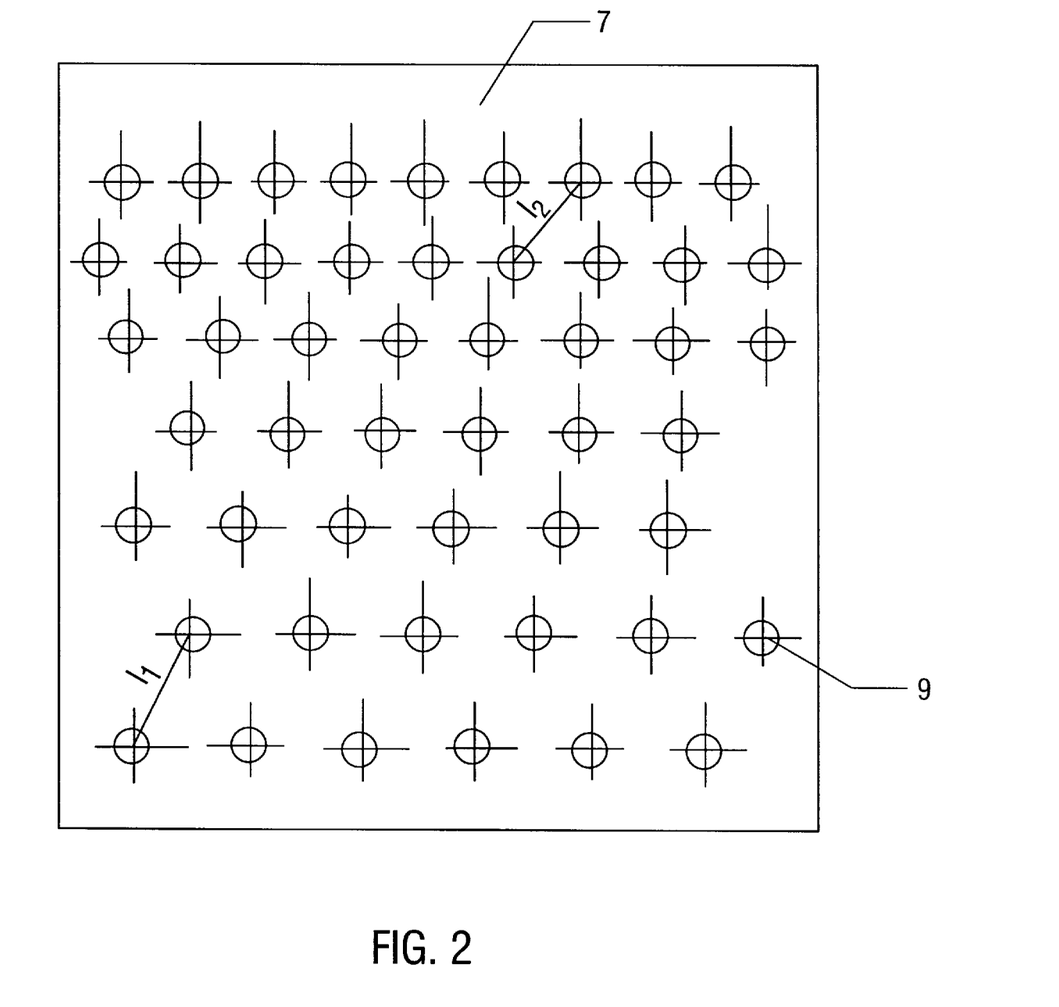
FIG. 2 shows a view of the internal wall 7 of the insert 5.

FIG. 2 shows a view of the internal wall 7 of the insert 5 having openings 9 of the same diameter, between which openings the distance l changes from $l_1$ to $l_2$, where $l_1/l_2$= 1.2–2.5 (e.g. from 75 to 40 mm at a diameter of 15 mm for each hole).

Figure 3:
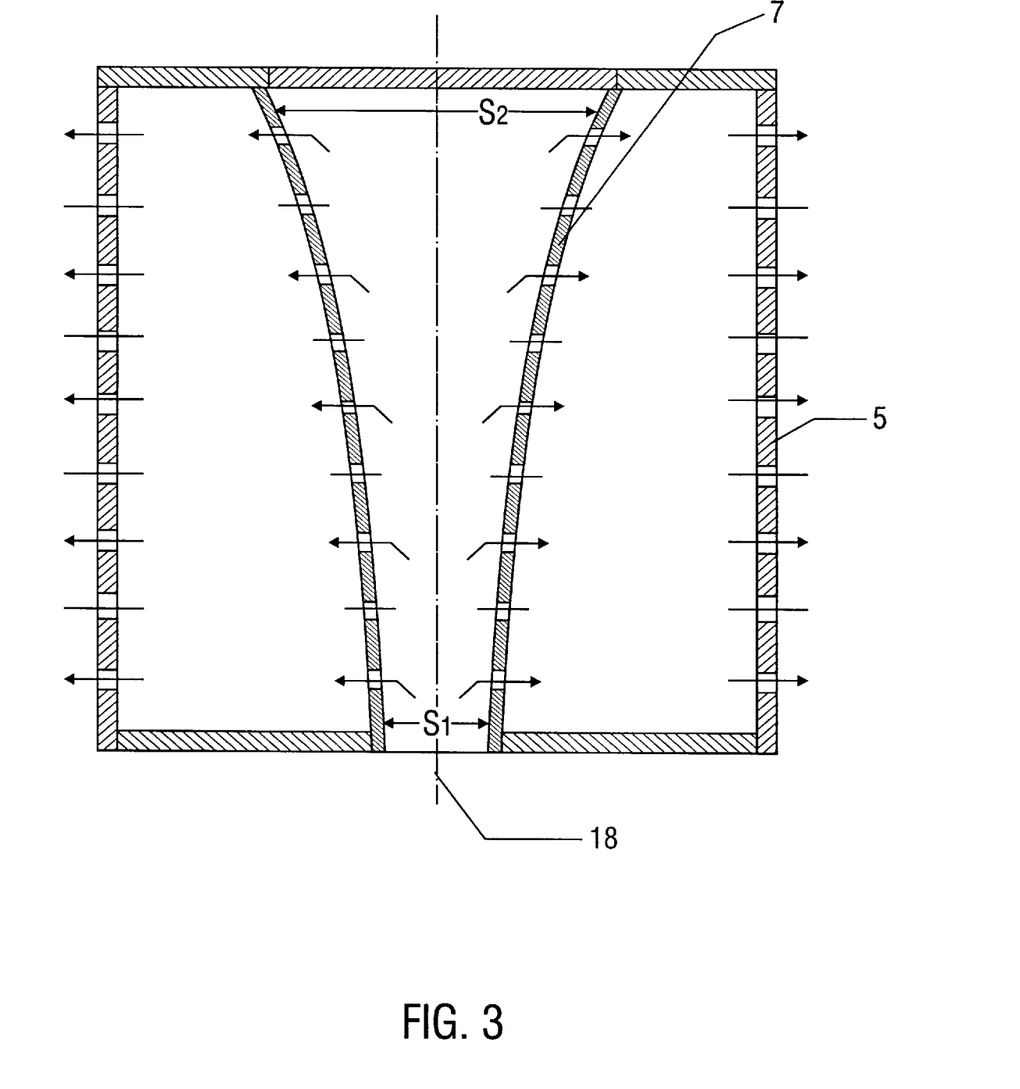
FIG. 3 shows an embodiment of the insert 5.

FIG. 3 shows an embodiment of the insert 5, in which the internal wall 7 has a diameter which increases in the direction of the axis 18 of the insert from the end nearest the port 2 for the entry of the feed mixture to the other end.

Figure 4:
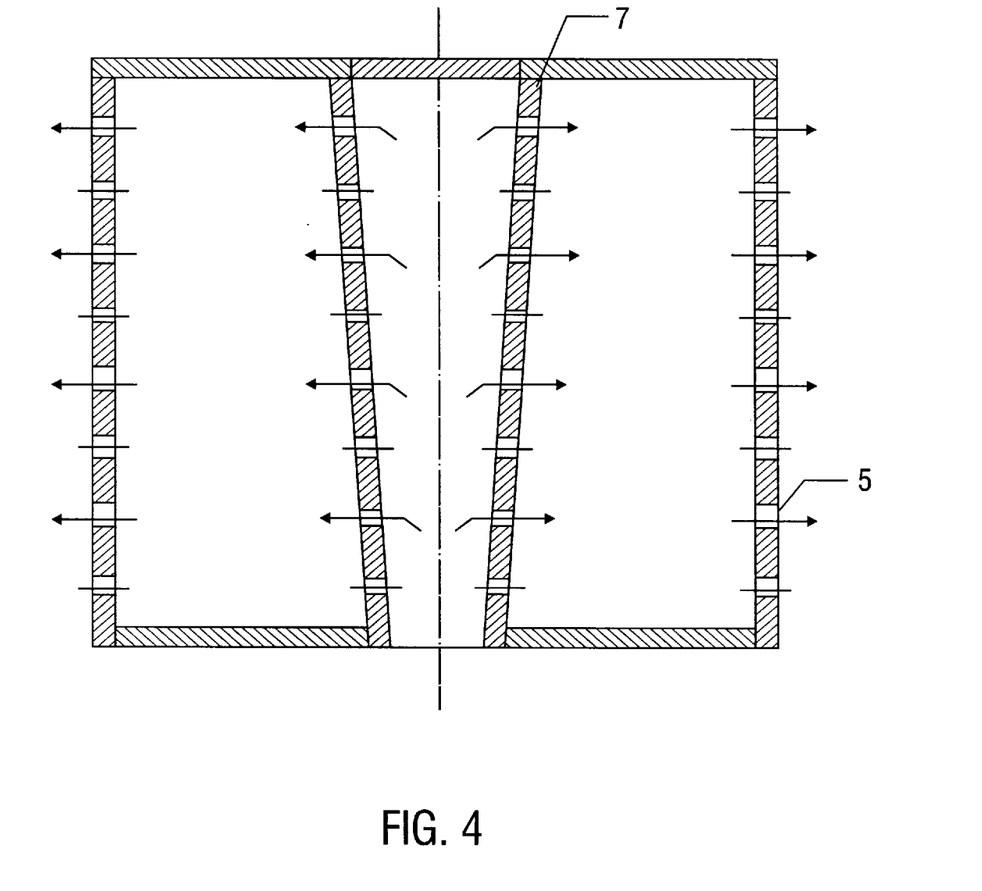
FIG. 4 shows an embodiment of the insert 5 in which the internal wall 7 has a conical shape.

FIG. 4 shows an embodiment of the insert 5 in which the internal wall 7 has a conical shape (here the widening is from the inlet 2 for the feed mixture to the opposite end).

Figure 5:
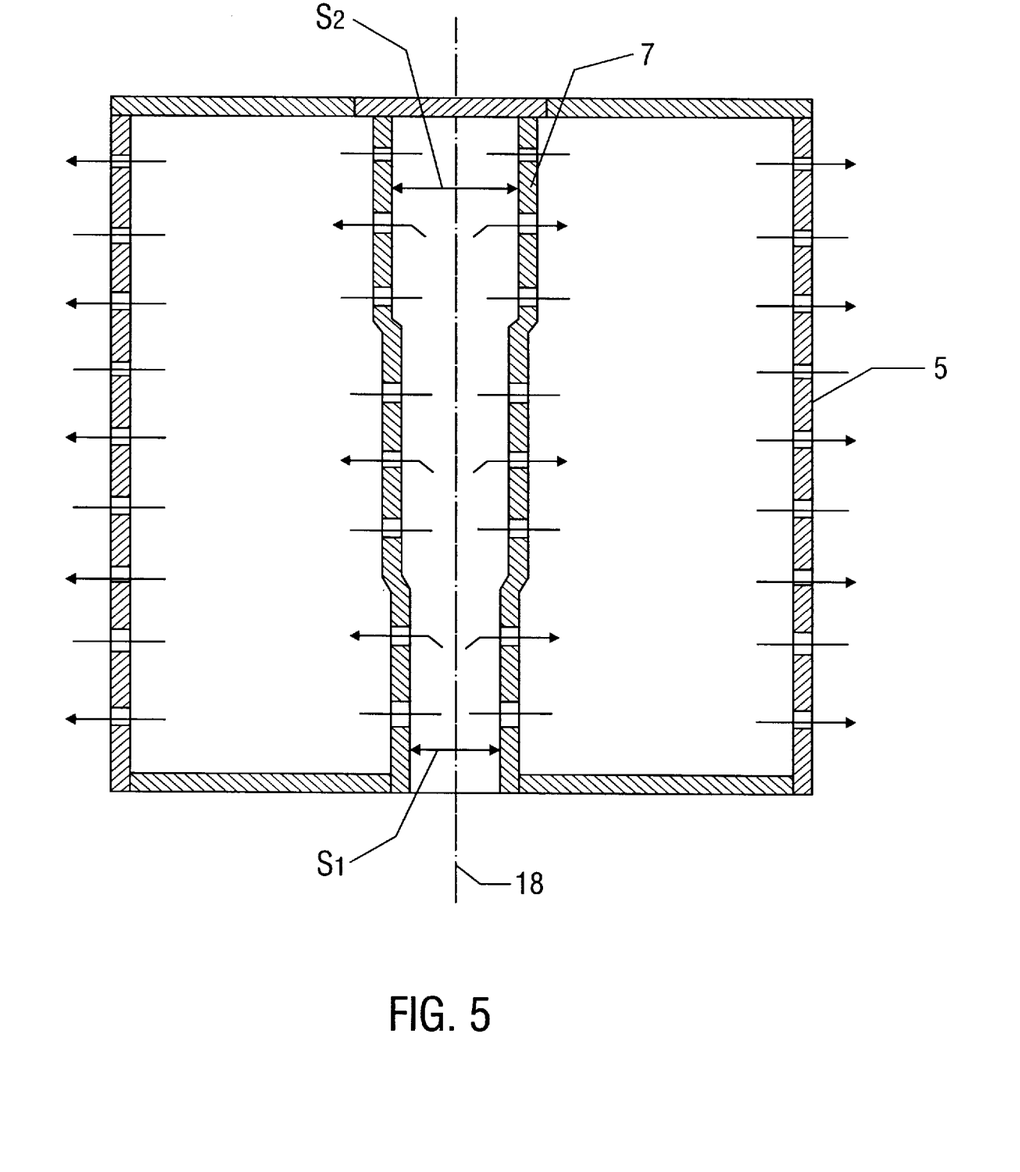
FIG. 5 shows an embodiment of the insert 5 in which the internal wall 7 is, viewed in axial section, in the form of steps.

FIG. 5 shows an embodiment of the insert 5 in which the internal wall 7 is, viewed in axial section, in the form of steps. Here, the diameter and the length of the steps increase in the direction of the axis 18 of the insert from the end thereof nearest the entry port 2 for the feed mixture to the other end. The axial cross-sectional area of the steps increases in such a way that $S_2/S_1$=1.2–2.5.

The reactor operates in the following way.

The ports 15 and 16 are opened and the required amount of catalyst is introduced between the walls 6 and 7 of the insert 5. The ports 16 and 18 are then closed.

The catalyst is dried in a stream of inert gas having a temperature of up to 250° C. over the course of several hours. The inert gas is gradually replaced by a hydrogen-containing gas which is likewise fed in at a temperature of 250° C. The catalyst is reduced. Subsequently, a hydroxychlorination is carried out to activate the catalyst. The catalyst is now ready for service. At 250° C., the addition of hydrocarbon feed to the circulated gas is then commenced with simultaneous raising of the entry temperature to the process temperature. The steam/gas mixture flows through the entry port 2, enters the interior of the insert, flows through the openings 9 of the internal wall 7 and then through the catalyst bed 10 where it is subjected to chemical reactions, subsequently flows through the openings 8 in the wall 6 into the intermediate space 4 and from there through the openings 18 of the cover 12 and finally leaves the reactor via the exit port 3. Exactly this flow direction of the gas/steam mixture is ensured by the covers 11, 12 and 14.

The examples below illustrate the process of the invention.

EXAMPLE 1

(comparison in accordance with the nearest prior art)

The process is carried out in the reactor 1 under the following conditions.

| | |
|---|---|
| Entry temperature of the mixture of hydrogen and hydrocarbons | 494° C. |
| Exit temperature of the mixture | 450° C. |
| Pressure in the reactor | 3 MPa |
| Flow factor | 1475.5 standard $m^3$ of hydrogen-containing gas per standard $m^3$ of hydrocarbon |
| Molar ratio of hydrogen/hydrocarbons | 8:1 |
| Hydrogen concentration in the gas | 80% |
| Space velocity | 1.524 $h^{-1}$. |

The composition of the feed mixture and the product at the reactor outlet are shown in Table 1.

TABLE 1

| | Composition (kmol/h) | | | | | |
|---|---|---|---|---|---|---|
| Steam | $H_2$ | Dry gas | Aromatics | Napthenes | n-paraffins | iso-paraffins |
| Feed mixture on entry into the 1st reactor | 9522.32 | 2531.25 | 105.4336 | 338.5622 | 292.1307 | 505.05 |
| Gas mixture at the exit of the 1st reactor | 9827.56 | 2624.85 | 424.2 | 125.23 | 283.74 | 499.82 |

The product drawn off from the 1st reactor is fed to the 2nd reactor which is operated under the following conditions.

| | |
|---|---|
| Entry temperature | 496° C. |
| Exit temperature | 473° C. |

The other operating conditions correspond to those in the preceding reactor. The composition of the feed mixture and the product on leaving the 2nd reactor is shown in Table 2.

TABLE 2

| Steam | Composition (kmol/h) | | | | | |
|---|---|---|---|---|---|---|
| | H$_2$ | Dry gas | Aromatics | Napthenes | n-paraffins | iso-paraffins |
| Feed mixture on entry into the 2nd reactor | 9827.56 | 2624.85 | 424.2 | 125.23 | 283.74 | 499.82 |
| Gas mixture at the exit of the 2nd reactor | 9931.3 | 2745.26 | 476.68 | 71.00 | 272.4 | 496.8 |
| Gas mixture at the reactor exit after reconstruction | 9373.6 | 2749.01 | 467.33 | 97.7 | 284.9 | 504.0 |

The product from the 2nd reactor is fed to the 3rd reactor.
Temperature on entry into the 3rd reactor 490° C.
Exit temperature 434.2° C.
The other operating parameters are analogous to those in the 2nd reactor.

The composition of the feed mixture and the product on leaving the 3rd reactor is shown in Table 3.

TABLE 3

| Steam | Composition (kmol/h) | | | | | |
|---|---|---|---|---|---|---|
| | H$_2$ | Dry gas | Aromatics | Napthenes | n-paraffins | iso-paraffins |
| Feed mixture on entry into the 3rd reactor | 9931.3 | 2745.26 | 476.68 | 71.00 | 272.4 | 496.8 |
| Gas mixture at the exit of the 3rd reactor | 10045.18 | 2913.53 | 519.43 | 48.23 | 246.08 | 492.71 |

When carrying out the process in accordance with the comparative example (gas/steam mixture flows in the direction from the circumference to the centre of the reactor), the yield of final product is 93.86% at a MON of 77.2.

EXAMPLE 2

Example 1 is repeated except that in the 2nd reactor the steam/gas mixture flows in the direction from the centre to the circumference. The composition of the feed mixture on entry into the 2nd reactor corresponds to that of Example 1. The composition of the product leaving the 2nd reactor is shown in Table 4.

TABLE 4

| Steam | Composition (kmol/h) | | | | | |
|---|---|---|---|---|---|---|
| | H$_2$ | Dry gas | Aromatics | Napthenes | n-paraffins | iso-paraffins |
| Gas mixture at the exit of the 2nd reactor | 9878.6 | 2749.01 | 467.33 | 97.7 | 284.3 | 504.0 |

The product of the 2nd reactor is fed into the 3rd reactor which is operated under the same conditions as in Example 1. This gives a product having the composition shown in Table 5.

TABLE 5

| | Composition (kmol/h) | | | | | |
|---|---|---|---|---|---|---|
| Steam | H$_2$ | Dry gas | Aromatics | Napthenes | n-paraffins | iso-paraffins |
| Gas mixture at the exit of the 3rd reactor | 9898.86 | 2913.7 | 511.89 | 51.49 | 249.2 | 508.82 |

When carrying out the process as described in Example 2 (the steam/gas mixture in the 1st and in the 3rd reactor flows from the circumference to the centre of the reactor, while in the 2nd reactor it flows from the centre of the reactor to the circumference), the yield of final product is 94.74% by mass at a MON of 78.

EXAMPLE 3

Example 2 is repeated except that the temperature on entering the 3rd reactor is 496° C. From the 3rd reactor, a product having the composition shown in Table 6 is drawn off.

TABLE 6

| | Composition (kmol/h) | | | |
|---|---|---|---|---|
| Steam | Aromatics | Napthenes | n-paraffins | iso-paraffins |
| Gas mixture at the exit of the 3rd reactor | 534.43 | 31.36 | 201.49 | 472.2 |

The MON of the product obtained is 85.

The process of the invention thus allows, on the one hand, the yield of petrol of high octane number to be increased from 93.86% to 94.74% and, on the other hand, its quality to also be improved by increasing the octane number by 8 points.

We claim:

1. A reactor for carrying out a process for producing petrol of high octane number by catalytic reforming of a feed mixture of hydrogen and hydrocarbons, the reactor comprising a housing (1) having an internal and external wall surface and ports for entry of a feed mixture and exit of reformate, a hollow insert having an axis and two ends arranged in the housing clear of the external wall and the internal surface of the housing and having an internal wall and an external wall which are arranged coaxially and provided with openings with both ends of the insert having openings and being fitted with covers one cover being in the form of an annulus and arranged between the internal surface of the housing and the internal wall of the insert and the other cover being circular in shape and the end of the insert is able to be completely covered, wherein the circular cover is fitted to the end nearest the entry port for the feed mixture while the annular cover is fitted to the end nearest the exit port for the reformate, and wherein the internal wall of the insert is cylindrical in shape, with its openings being arranged so the distance between them in the direction of the axis of the insert decreases from the end nearest the entry port for the feed mixture to the other end by a factor of 1.2–2.5.

2. A reactor for carrying out a process for producing petrol of high octane number by catalytic reforming of a feed mixture of hydrogen and hydrocarbons, the reactor comprising a housing having an internal and external wall surface and polls for entry of a feed mixture and exit of reformate, a hollow insert having an axis and two ends arranged in the housing clear of the external wall and the internal surface of the housing and having an internal wall and an external wall which are provided with openings with both ends of the insert having openings and being fitted with covers one cover being in the form of an annulus and arranged between the internal surface of the housing and the internal wall of the insert and the other cover being circular in shape and the end of the insert is able to be completely covered, wherein the circular cover is fitted to the end nearest the entry port for the feed mixture while the annular cover is fitted to the end nearest the exit port for the reformate, and wherein the axial cross-sectional area surrounded by the internal wall of the insert increases in the direction of the axis of the insert from the end thereof nearest the entry port for the feed mixture to the other end by a factor of 1.2–2.5.

3. The reactor according to claim 2, wherein the internal wall of the insert is, viewed in axial section, conical in shape.

4. The reactor according to claim 2, wherein the internal wall of the insert is, viewed in axial section, in the form of steps.

5. The reactor according to claim 1 or 2, wherein the cover consists of at least two parts.

6. A process for producing petrol of high octane number by catalytic reforming of a feed mixture of hydrogen and hydrocarbons by passing hiss mixture through a platinum/rhenium catalyst arranged in the form of a hollow cylinder in a reactor according to claim 1 or 2, perpendicular to the cylinder axis in a direction from the cylinder axis to the circumference thereof at a temperature of at 450°–500° C., a pressure of 1.5–3 MPa, and a space velocity of $1.5^{1-}1.8^{-1}$.

7. The process according to claim 6 wherein the feed mixture is passed through at a volume ratio of hydrogen or hydrogen-containing gas to hydrocarbons of 1200–1800 $Nm^{3/Nm3}$.

* * * * *

UNITED STATES PATENT AND TRADEMARK OFFICE
CERTIFICATE OF CORRECTION

PATENT NO. : 5,885,442

DATED : March 23, 1999

INVENTOR(S) : Lapunow et al.

It is certified that error appears in the above-identified patent and that said Letters Patent is hereby corrected as shown below:

In claim 2, cloumn 10, line 19, delete "polls", and insert the following therefor: -- ports --.

In claim 6, column 10, line 46, delete "hiss", and insert the following therefor: -- this --.

In claim 7, column 10, line 55, delete "$Nm^{3/Nm3}$", and insert the following therefor: -- $Nm^3/Nm^3$ --.

Signed and Sealed this

Twenty-sixth Day of October, 1999

Attest:

Q. TODD DICKINSON

*Attesting Officer*   *Acting Commissioner of Patents and Trademarks*

UNITED STATES PATENT AND TRADEMARK OFFICE
CERTIFICATE OF CORRECTION

PATENT NO. : 5,885,442

DATED : March 23, 1999

INVENTOR(S) : Michael Grigorjewitsch Lapunow et al.

It is certified that error appears in the above-identified patent and that said Letters Patent is hereby corrected as shown below:

At column 5, line 7, please delete "12" and insert therefore -- 11 --.

At column 5, line 8, please delete "12".

At column 5, line 10, please delete "14".

At column 5, line 13, please delete "11" and insert therefore -- 12 --.

Signed and Sealed this

Twenty-second Day of February, 2000

Attest:

Q. TODD DICKINSON

*Attesting Officer*          *Commissioner of Patents and Trademarks*